United States Patent
Shibata (10) Patent No.: US 7,103,389 B2
(45) Date of Patent: Sep. 5, 2006

(54) RADIO COMMUNICATION DEVICE CAPABLE OF GENERATING MELODY PATTERNS VIA SOUND, TACTICAL AND VISUAL NOTIFICATIONS

(75) Inventor: Shinji Shibata, Ichinomiya (JP)

(73) Assignee: Denso Corporation, Kariya (JP)

( * ) Notice: Subject to any disclaimer, the term of this patent is extended or adjusted under 35 U.S.C. 154(b) by 960 days.

(21) Appl. No.: 09/810,894

(22) Filed: Mar. 16, 2001

(65) Prior Publication Data

US 2001/0023197 A1 Sep. 20, 2001

(30) Foreign Application Priority Data

Mar. 16, 2000 (JP) .................................. 2000-079364

(51) Int. Cl.
*H04B 3/36* (2006.01)

(52) U.S. Cl. ..................... 455/567; 455/412.2; 340/753

(58) Field of Classification Search .............. 455/412.1, 455/412.2, 413, 566, 567; 340/7.1, 7.2, 7.31, 340/7.39, 7.51, 7.52, 7.53, 7.59, 7.6, 7.61, 340/7.62

See application file for complete search history.

(56) References Cited

U.S. PATENT DOCUMENTS 6,337,972 B1 * 1/2002 Jones et al. ................. 340/7.57
6,359,550 B1 * 3/2002 Brisebois et al. ......... 340/407.1
6,411,198 B1 * 6/2002 Hirai et al. ................... 340/7.6
2006/0040649 A1 * 2/2006 Luneau ....................... 455/415

FOREIGN PATENT DOCUMENTS

| JP | 2-57646 | 4/1990 |
|---|---|---|
| JP | 08-289343 | 11/1996 |
| JP | 09-191333 | 7/1997 |
| JP | 10-257135 | 9/1998 |
| JP | 11-252212 | 9/1999 |
| JP | 2000-078632 | 3/2000 |

OTHER PUBLICATIONS

Japanese Office Action dated Feb. 3, 2004 in corresponding Japanese Application No. 2000–079364.

* cited by examiner

*Primary Examiner*—Edan Orgad
(74) *Attorney, Agent, or Firm*—Harness, Dickey & Pierce, PLC (57) ABSTRACT

Sound source pulses are output to a sound drive circuit based on first to fourth sound source data of a ringer melody. Thus, the sound drive circuit drives a speaker based on the sound source pulses. As a result, the ringer melody including first to fourth melodic lines is output from the speaker. One melodic line is selected from the first to fourth melodic lines, and a melodic line pulse is outputted to a vibration drive circuit based on the sound source data of the selected melodic line. As a result, the vibration drive circuit drives a vibrator based on the melodic line pulse, so that the vibrator vibrates based on the selected melodic line.

15 Claims, 7 Drawing Sheets

RADIO COMMUNICATION DEVICE CAPABLE OF GENERATING MELODY PATTERNS VIA SOUND, TACTICAL AND VISUAL NOTIFICATIONS

CROSS REFERENCE TO RELATED APPLICATION

This application is based on and incorporates herein by reference Japanese Patent Application No. 2000-79364 filed on Mar. 16, 2000.

FIELD OF THE INVENTION

The present invention relates to a radio communication device, such as a Personal Handyphone System (PHS) phone, a cellular phone or the like, and more particularly to a radio communication device that generates a ringer melody including a plurality of melodic lines in response to an incoming call.

BACKGROUND OF THE INVENTION

Japanese Unexamined Patent Publication No. 9-191333, for example, discloses a cellular phone having a vibrator that vibrates synchronously with monotone ringer sound generated in response to an incoming call. This notifies the incoming call to a user even if irrelevant vibrations are transmitted from its surroundings.

Recently, a ringer melody including a plurality of melodic lines has been used to improve quality of the ringer melody in such a cellular phone. When the vibrator of the cellular phone is vibrated synchronously with such a ringer melody, especially a melody having a complex composition, the vibrator vibrates continuously instead of with a recognizable pulse. Thus, it is difficult to distinguish the vibrations of the vibrator from the irrelevant vibrations transmitted from its surroundings.

SUMMARY OF THE INVENTION

The present invention addresses these and other disadvantages by providing a radio communication device that effectively notifies an incoming call to a user of the radio communication device by means other than a ringer melody. This Includes a plurality of melodic lines operated based on the ringer melody.

To achieve the objective of the present invention, a radio communication device is provided that includes first and second notifying devices for notifying of an incoming call. The first notifying device notifies the incoming call by generating a ringer melody including a plurality of melodic lines. The second notifying device notifies the incoming call based on one of the melodic lines. The second notifying device may include a vibrator and a vibration control device for controlling the vibrator. The vibrator is controlled by the vibration control device to vibrate based on the one of the melodic lines.

Alternatively, the second notifying device may include a light emitting device and a light-emission control device for controlling the light emitting device. The light emitting device is controlled by the light-emission control device to emit light based on one of the melodic lines. Furthermore, the second notifying device may include a display device for displaying graphics and a display control device for controlling the display device. The display device is controlled by the display control device to change the graphic based on the one of the melodic lines.

The radio communication device may further include a selector for selecting one of the melodic lines. The second notifying device may notify the incoming call based on the one of the melodic lines selected by the selector.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE INVENTION

Figure 1:
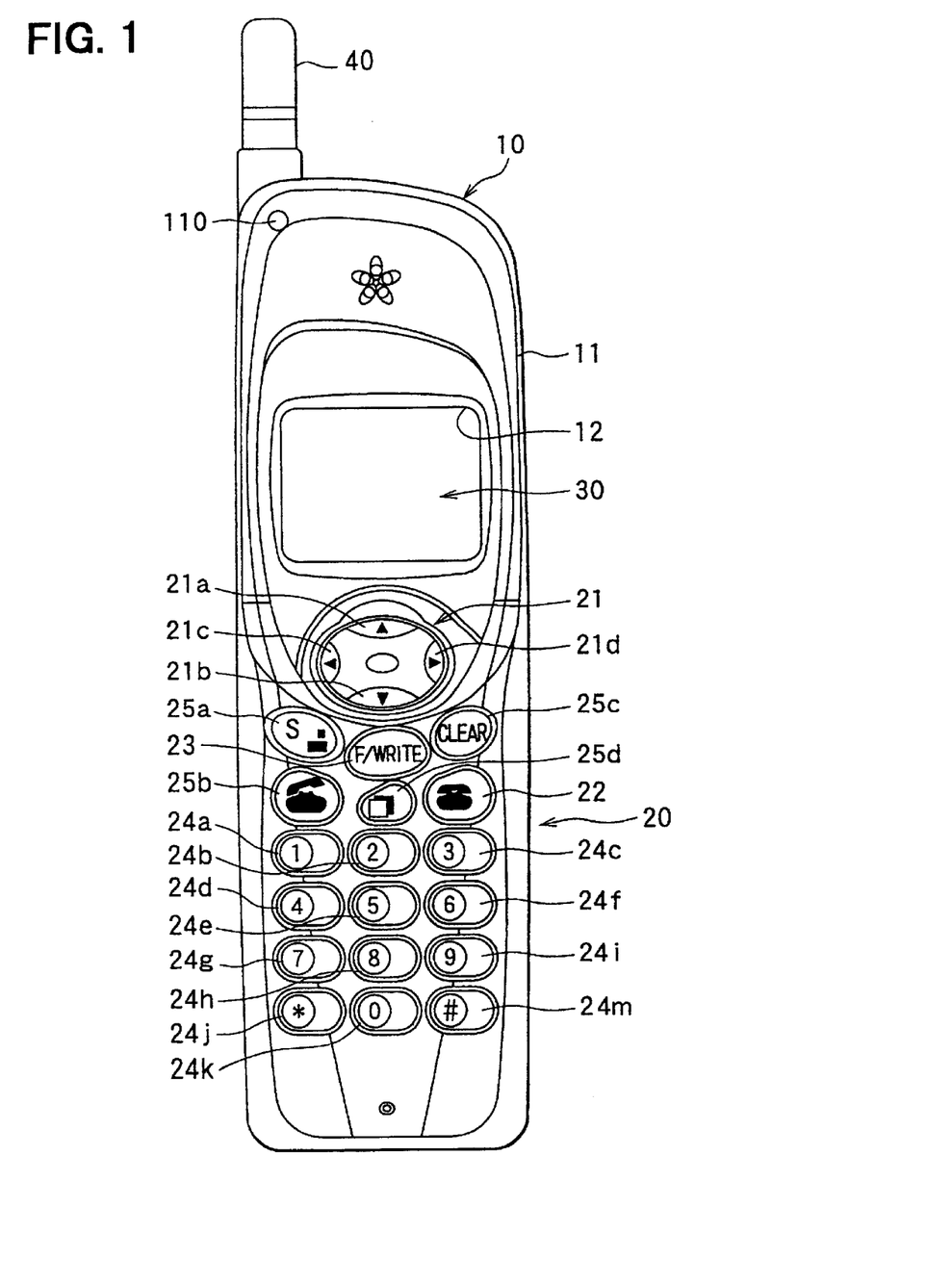
FIG. 1 is a front view of a cellular phone according to a first embodiment of the present invention.

Referring As shown in FIG. 1, a cellular phone according to a first embodiment of the present invention includes a casing 10, a keypad 20 and a display 30. The keypad 20 is arranged in a front cover 11 of the casing 10. The keypad 20 includes an arrow key unit 21, a power key 22, a function key (F) 23, alphanumeric keys 24*a*–24*k*, 24*m*, an answering key 25*b* and other keys 25*a*, 25*c*–25*d*. The display (liquid crystal display panel) 30 is arranged within an opening 12 defined in the front cover 11 of the casing 10 to display various information.

Figure 2:
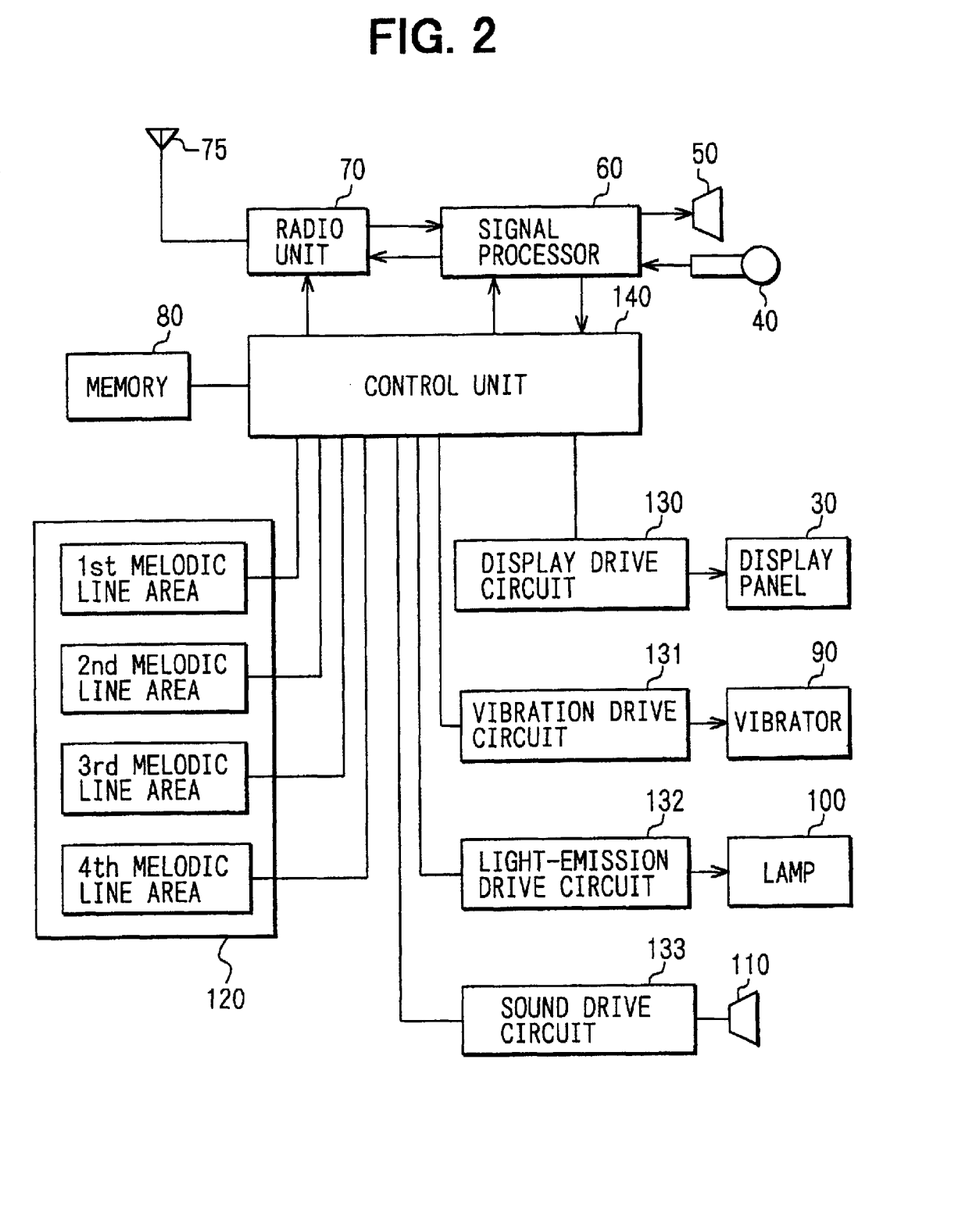
FIG. 2 is a block diagram showing an electric circuit arrangement of the cellular phone shown in FIG. 1.

An electric circuit arrangement of the cellular phone will be discussed with reference to FIG. 2. As shown in FIG. 2, the cellular phone further includes a microphone (mouthpiece) 40, a receiver (earpiece) 50, a signal processor 60, a radio unit 70, an antenna 75, a memory 80, a vibrator 90, a lamp 100, a ringer speaker 110, a sound source memory 120, a display drive circuit 130, a vibration drive circuit 131, a light-emission drive circuit 132, a sound drive circuit 133 and a control unit 140.

The display panel 30 is driven by the display drive circuit 130 and displays various information. The microphone 40 converts user's voice to voice signals and outputs them to the signal processor 60. The receiver 50 reproduces voices of an opposite party based on voice signals received from the signal processor 60. The signal processor 60 is controlled by the control unit 140 and converts demodulated signals received from the radio unit 70 to voice signals. Then, the signal processor 60 outputs the voice signals to the receiver 50. Furthermore, the signal processor 60 converts voice signals received from the microphone 40 to transmission signals and outputs them to the radio unit 70.

The radio unit 70 demodulates signals received from a base station via the antenna 75 and outputs them to the signal processor 60. Furthermore, the radio unit 70 modulates the transmission signals received from the signal processor 60 and transmits them to the base station via the antenna 75. The memory 80 stores a computer program of the control unit 140. The vibrator 90 is driven by the vibration drive circuit 131 and is thereby vibrated. The lamp (light emitting diode) 100 is driven by the light-emission drive circuit 132 and thereby flashes. The ringer speaker 110 is driven by the sound drive circuit 133 and thereby generates the ringer melody.

The sound-source memory 120 stores sound-source data of more than one ringer melody and includes first to fourth melodic line areas. The first melodic line area stores sound source data of a first melodic line of each ringer melody. The second melodic line area stores sound source data of a second melodic line of each melody. The third melodic line area stores sound source data of a third melodic line of each melody. The fourth melodic line area stores sound source data of a fourth melodic line of each melody. The control unit 140 includes a microcomputer and conducts an incoming call setting operation, an incoming call processing operation and an interrupt operation for the incoming call processing operation.

Figure 3:
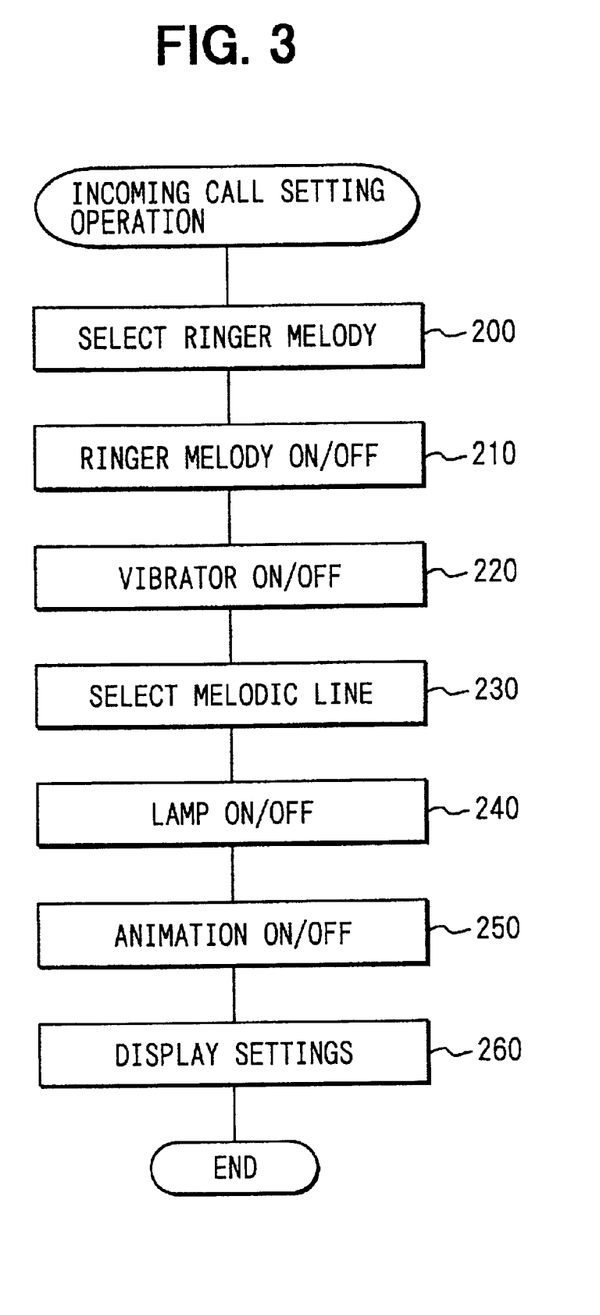
FIG. 3 is a flowchart showing an incoming call setting operation conducted by a control unit shown in FIG. 2.

The incoming call setting operation conducted by the control unit 140 will be described with reference to FIG. 3. The control unit 140 conducts the incoming call setting operation by following a flowchart shown in FIG. 3. The incoming call setting operation starts when a function No. 15 is selected by pressing the alphanumeric key "1" 24a and then pressing the alphanumeric key "5" 24e while waiting for an incoming call.

First, the display drive circuit 130 is controlled to display a ringer melody selection menu indicating "1. MELODY A", "2. MELODY B" and "3. MELODY C" on the display panel 30 at step 200. In this instance, the first melody A is selected by pressing the alphanumeric key "1" 24a. The second melody B is selected by pressing the alphanumeric key "2" 24b. The third melody C is selected by pressing the alphanumeric key "3" 24c. After the desired key is pressed, the result of this selection is stored in the memory 80.

Then, the display drive circuit 130 is controlled to display a melody ON/OFF selection menu indicating "1. ON" and "2. OFF" on the display panel 30 at step 210. By pressing the alphanumeric key "1" 24a, generation of the ringer melody is allowed when the incoming call is received. By pressing the alphanumeric key "2" 24b, the generation of the ringer melody is disallowed when the incoming call is received. After the desired key is pressed, the result of this selection is stored in the memory 80.

Next, the display drive circuit 130 is controlled to display a vibrator ON/OFF selection menu indicating "1. ON" and "2. OFF" on the display panel 30 at step 220. By pressing the alphanumeric key "1" 24a, vibration of the vibrator 90 is allowed when the incoming call is received. By pressing the alphanumeric key "2" 24b, the vibration of the vibrator 90 is disallowed when the incoming call is received. After the desired key is pressed, the result of this selection is stored in the memory 80.

Then, the display drive circuit 130 is controlled to display a melodic line selection menu indicating "1. FIRST MELODIC LINE", "2. SECOND MELODIC LINE", "3. THIRD MELODIC LINE" and "4. FOURTH MELODIC LINE" on the display panel 30 at step 230. The first melodic line is selected by pressing the alphanumeric key "1" 24a. The second melodic line is selected by pressing the alphanumeric key "2" 24b. The third melodic line is selected by pressing the alphanumeric key "3" 24c. The fourth melodic line is selected by pressing the alphanumeric key "4" 24d. After the desired melodic line for vibrating the vibrator 90 is selected, the result of this selection is stored in the memory 80.

Thereafter, the display drive circuit 130 is controlled to display a lamp ON/OFF selection menu indicating "1. ON" and "2. OFF" on the display panel 30 at step 240. The lamp 100 is enabled by pressing the alphanumeric key "1" 24a to allow flickering of the lamp 100 when the incoming call is received. The lamp 100 is disabled by pressing the alphanumeric key "2" 24b to disallow flickering of the lamp 100 when the incoming call is received. After the desired key is selected, the result of this selection is stored in the memory 80.

Then, the display drive circuit 130 is controlled to display an animation ON/OFF selection menu indicating "1. ON" and "2. OFF" on the display panel 30 at step 250. By pressing the alphanumeric key "1" 24a, the display of animation on the screen 30 is allowed when the incoming call is received. By pressing the alphanumeric key "2" 24b, the display of the animation on the screen 30 is disallowed when the incoming call is received. After the desired key is pressed, the result of this selection is stored in the memory 80. Thereafter, at step 260, the display control circuit 130 is controlled to display (by pictorial display) the results of the selections made at steps 200–250 on the display panel 30 while waiting for a new incoming call.

Figure 4:
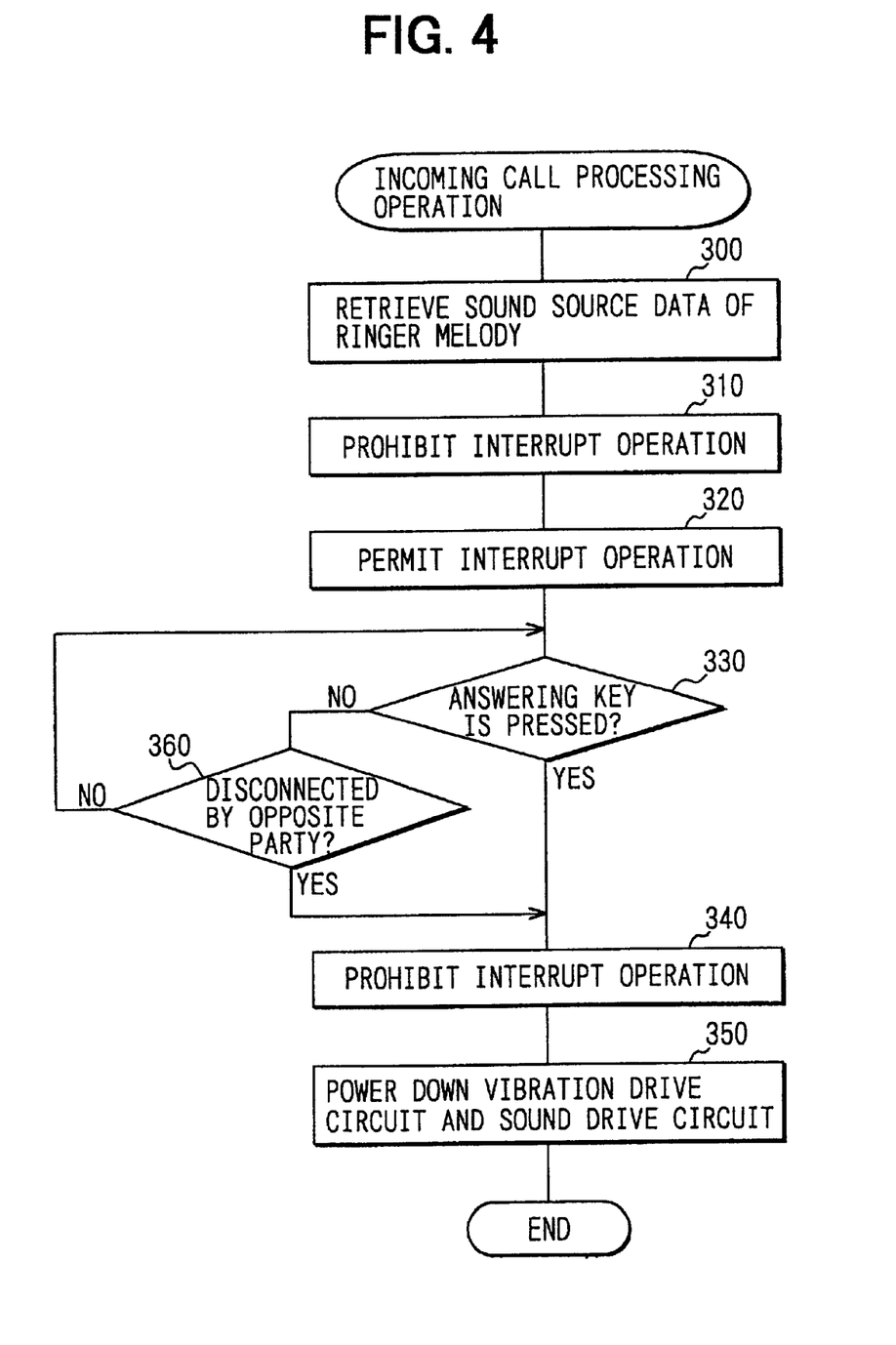
FIG. 4 is a flowchart showing an incoming call processing operation conducted by a control unit of the present invention.

The incoming call processing operation conducted by the control unit 140 will be described with reference to FIG. 4. The control unit 140 processes the incoming call by following the flowchart shown in FIG. 4. The incoming call processing operation starts when an incoming call signal is received from the base station via the antenna 75 and the radio unit 70 while waiting for an incoming call. First, at step 300, the first to fourth sound-source data of the ringer melody selected at step 200 are retrieved from the sound-source memory 120. Then, at step 310, the interrupt operation for the incoming call processing operation is prohibited.

Next, at step 320, the interrupt operation for the incoming call processing operation is permitted. Then, at step 330, it is determined whether the answering key 25b is pressed. If it is, control moves to step 340 where the interrupt operation for the incoming call processing operation is prohibited. Thereafter, at step 350, both the vibration drive circuit 131 and the sound drive circuit 133 are turned off (power down). Alternatively, if it is determined that the answering key 25b is not pressed at step 330, control moves to step 360 where it is determined whether the opposite party has disconnected the communication line. If it has, control passes to step 340. If it has not, control returns to step 330. Thus, as long as step 330 and step 360 are repeated one after the other, the interrupt operation for the incoming call processing operation is repeated at predetermined time intervals.

Figure 5:
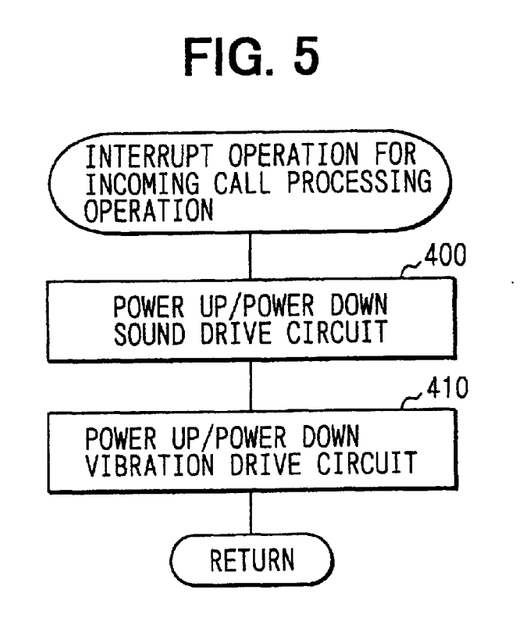
FIG. 5 is a flowchart showing an interrupt operation for the incoming call processing operation conducted by the control unit.

The interrupt operation for the incoming call processing operation conducted by the control unit 140 will be discussed with reference to FIG. 5 in greater detail. The control unit 140 conducts the interrupt operation for the incoming call processing operation by following the flowchart shown in FIG. 5. First, at step 400, sound source pulses of the selected ringer melody are outputted to the sound drive circuit 133 based on the first to fourth sound source data (retrieved at step 300) of the selected ringer melody. The sound drive circuit 133 drives the ringer speaker 110 based on the sound source pulses, so that the ringer melody including the first to fourth melodic lines is produced from the ringer speaker 110.

Next, at step 410, pulse signals of the one melodic line selected at step 230 are outputted to the vibration drive circuit 131 based on the sound source data of the one melodic line. The pulse signal of the melodic line becomes high during sound periods and becomes low during silent periods. The sound period is part of the ringer melody generating period where the sound continues at least for a predetermined time duration. The silent period is also part of the ringer melody generating period where the sound is not generated.

Thus, the vibration drive circuit 131 repeats power up and power down based on the pulse signals of the one melodic line. The vibration drive circuit 131 turns on the vibrator 90 at the high pulse signal level of the melodic line and turns off the vibrator 90 at the low pulse signal level of the melodic line. Thus, the vibrator 90 vibrates synchronously with the selected melodic line. As a result, in addition to the use of the ringer melody, the incoming call can be effectively notified to the user by use of the vibrator 90.

(Second Embodiment)

Figure 6:
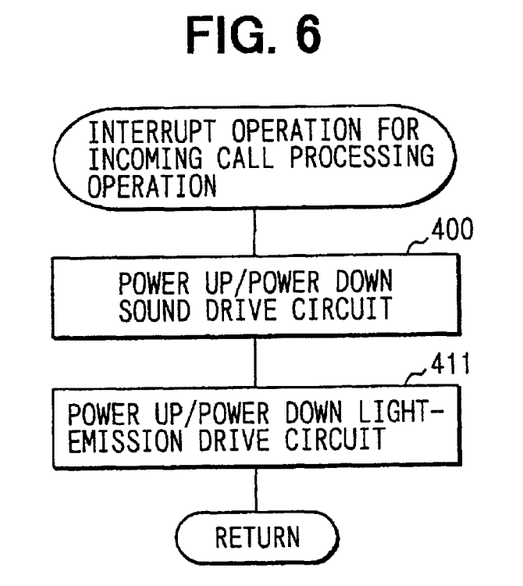
FIG. 6 is a flowchart showing another interrupt operation for the incoming call processing operation conducted by the control unit according to a second embodiment of the present invention.

In the first embodiment, the invention is discussed in connection with the case where the vibrations of the vibrator 90 are used to notify the incoming call to the user besides using the ringer melody. In place of the vibrations, flashes generated by the lamp 100 can be used. In a second embodiment, a flowchart shown in FIG. 6 is used in place of the flowchart shown in FIG. 5, and the control unit 140 conducts the interrupt operation for the incoming call processing operation by following the flowchart shown in FIG. 6. It should be noted that step 400 of FIG. 6 is the same as step 400 of FIG. 5.

The interrupt operation for the incoming call processing operation conducted by the control unit 140 according to the second embodiment will be described with reference to FIG. 6. First, after step 400, control moves to step 411 where the pulse signals of the one melodic line described above in connection with the first embodiment are outputted to the light-emission drive circuit 132. Thus, the light-emission drive circuit 132 repeats power up and power down based on the pulse signals of the melodic line. As a result, the light-emission drive circuit 132 turns on the lamp 100 at the high pulse signal level of melodic line and turns off the lamp 100 at the low pulse signal level of the melodic line. Thus, the lamp 100 is flashed synchronously with the selected melodic line.

(Third Embodiment)

Figure 7:
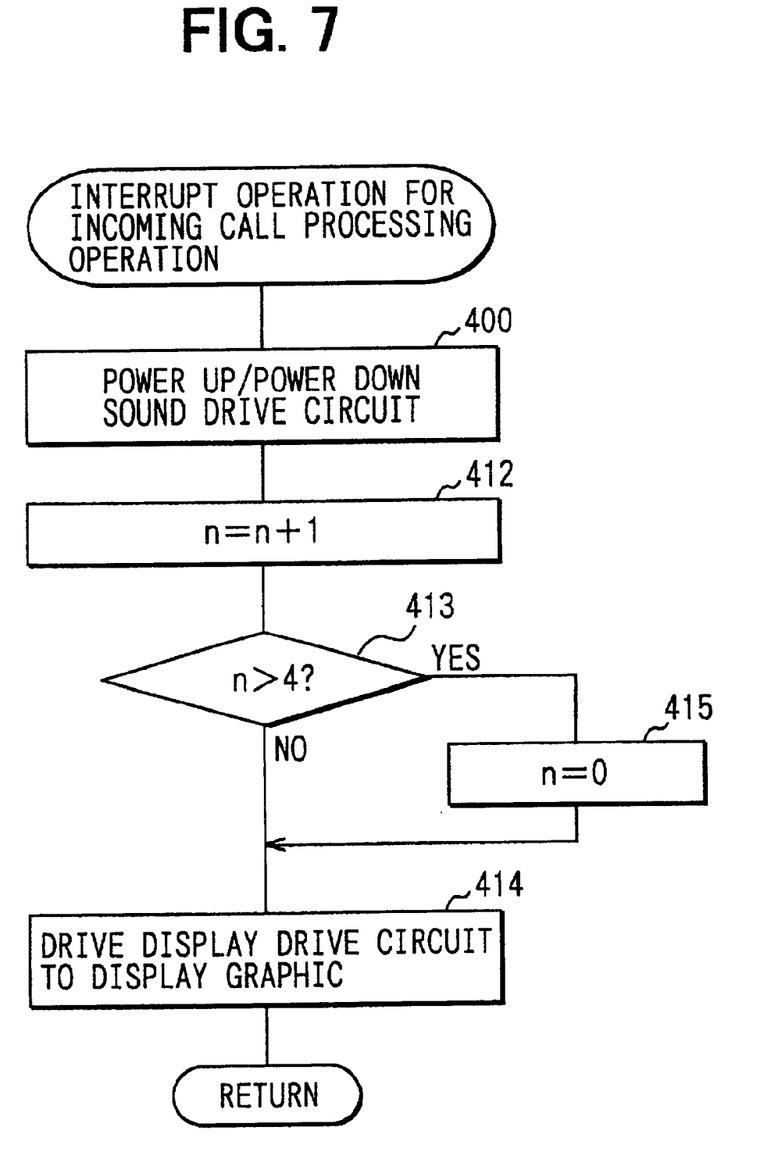
FIG. 7 is a flowchart showing another interrupt operation for the incoming call processing operation conducted by the control unit according to a third embodiment of the present invention.

In the second embodiment, the flashes generated by the lamp 100 are used to notify the incoming call to the user besides using the ringer melody. In place of the flashes, the animation can be displayed on the display panel 30. In a third embodiment, a flowchart shown in FIG. 7 is used in place of the flowchart shown in FIG. 6, and the control unit 140 conducts the interrupt operation for the incoming call processing operation by following the flowchart shown in FIG. 7. It should be noted that step 400 of FIG. 7 is the same as step 400 of FIG. 6.

The interrupt operation for the incoming call processing operation conducted by the control unit 140 according to the third embodiment will be described with reference to FIG. 7. First, after step 400, control moves to step 412 where a counter value n (=n+1) of a counter (not shown) is incremented based on the pulse signals of the one melodic line described above in connection with the first embodiment. That is, the counter value n is incremented at each initial rise of the pulse signal of the melodic line.

Then, at step 413, it is determined whether the counter value n is greater than 4. If the counter value n is equal to or smaller than 4 (n≦4), control moves to step 414 where the display drive circuit 130 is driven based on the counter value n, and thereby the display panel 30 displays a graphic based on the counter value n. If it is determined that the counter value n is greater than 4 (n>4) at step 413, control moves to step 415 where the counter is reset (n=0).

Figure 8A:
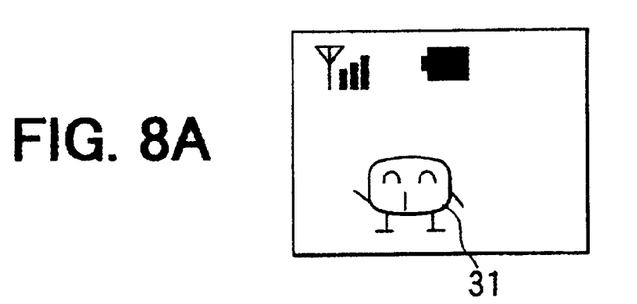
FIG. 8A is a diagram showing a series of graphics displayed on a display of the cellular phone according to the third embodiment of the present invention.
Figure 8B:
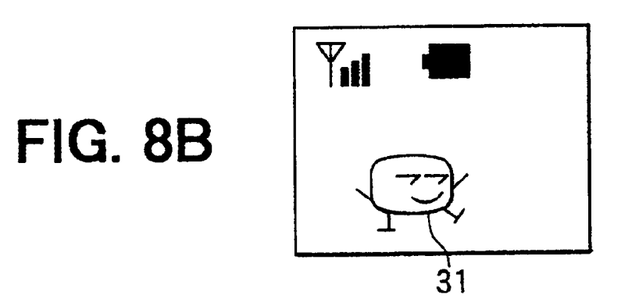
FIG. 8B is a diagram showing a series of graphics displayed on a display of the cellular phone according to the third embodiment of the present invention.
Figure 8C:
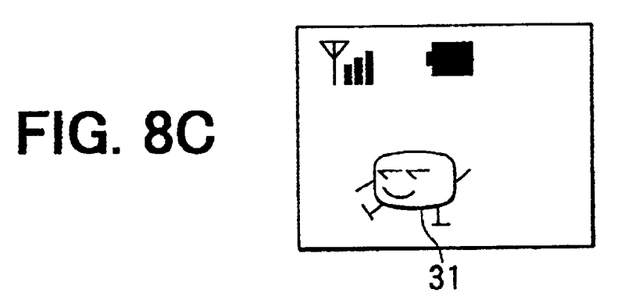
FIG. 8C is a diagram showing a series of graphics displayed on a display of the cellular phone according to the third embodiment of the present invention.
Figure 8D:
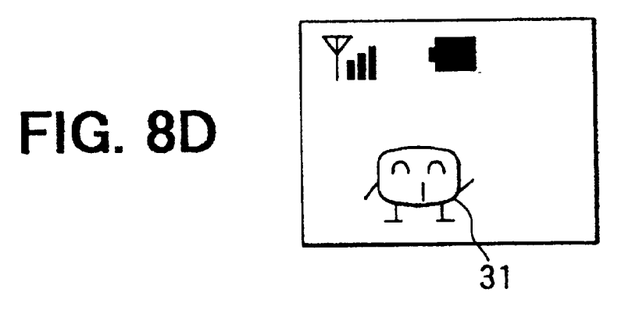
FIG. 8D is diagram showing a series of graphics displayed on a display of the cellular phone according to the third embodiment of the present invention.

In this way, the counter value n is repeatedly incremented from 1 to 4, and the display drive circuit 130 is controlled based on the increment of the counter value n. Thus, the display panel 30 displays a graphic shown in FIG. 8a when the counter value is n=1. The display panel 30 displays a graphic shown in FIG. 8b when the counter value is n=2. The display panel 30 displays a graphic shown in FIG. 8c when the counter value is n=3. The display panel 30 displays a graphic shown in FIG. 8d when the counter value is n=4.

In this way, a displayed character 31 changes based on the selected melodic line, as shown in FIGS. 8A–8D, so that the displayed character 31 dances synchronously with the selected melodic line.

The present invention is not limited to the cellular phones but equally applicable to the other radio communication devices, such as the PHS phones, beepers, or the like.

Additional advantages and modifications will readily occur to those skilled in the art. The invention in its broader terms is therefore not limited to the specific details, representative apparatus, and illustrative examples shown and described.

While the above-described embodiments refer to examples of usage of the present invention, it is understood that the present invention may be applied to other usage, modifications and variations of the same, and is not limited to the disclosure provided herein.

What is claimed is:

1. A radio communication device comprising:
    a first notifying device that notifies of an incoming call by generating a ringer melody, said ringer melody including a plurality of melodic lines;
    selector means for selecting one of the plurality of melodic lines; and
    a second notifying device that notifies of said incoming call, said second notifying device notifies of said incoming call based on said one of said plurality of melodic; wherein
    the second notifying means is controlled based on signals generated by sound source data of said selected one of said plurality of melodic lines.

2. A radio communication device according to claim 1, wherein said second notifying device includes:
- a vibrator; and
- a vibration control that controls said vibrator, wherein said vibrator is controlled by said vibration control to vibrate based on said one of said pluality of melodic lines.

3. A radio communication device according to claim 1, wherein said second notifying device includes:
- a light emitter; and
- a light-emission control that controls said light emitter, said light emitter is controlled by said light-emission control to emit light based on said one of said pluality of melodic lines.

4. A radio communication device according to claim 1, wherein said second notifying device includes:
- a display that displays a graphic; and
- a display control that controls said display, wherein said display is controlled by said display control to change said graphic based on said one of said plurality of melodic lines.

5. A radio communication device according to claim 1, further comprising a selector that selects said one of said plurality of melodic lines, wherein said second notifying device notifies of said incoming call based on said one of said plurality of melodic lines selected by said selector.

6. A radio communication device according to claim 1, further comprising second selector means for selecting said ringer melody from a plurality of ringer melodies.

7. A radio communication device comprising:
- a ringer melody having a plurality of melodic lines;
- first selector means for selecting one of said plurality of melodic lines of said ringer melody;
- a first notifying device that notifies of an incoming call by generating said plurality of melodic lines of said ringer melody; and
- a second notifying device that notifies of said incoming call based on sound signals generated by sound source data of said one of said plurality of melodic lines.

8. A radio communication device according to claim 7, wherein said second notifying device includes:
- a vibrator; and
- a vibration control that controls said vibrator, wherein said vibrator is controlled by said vibration control to vibrate based on said one of said plurality of melodic lines.

9. A radio communication device according to claim 8, wherein said second notifying device includes:
- a light emitter; and
- a light-emission control that controls said light emitter, said light emitter is controlled by said light-emission control to emit light based on said one of said plurality of melodic lines.

10. A radio communication device according to claim 7, wherein said second notifying device includes:
- a display that displays a graphic; and
- a display control that controls said display, wherein said display is controlled by said display control to change said graphic based on said one of said plurality of melodic lines.

11. A radio communication device according to claim 7, further comprising a selector that selects said one of said plurality of melodic lines, wherein said second notifying device notifies of said incoming call based on said one of said plurality of melodic lines selected by said selector.

12. A radio communication device comprising:
- a first notifying means for notifying an incoming call by generating a ringer melody, which includes a plurality of melodic lines; and
- a second notifying means for notifying the incoming call, wherein the second notifying means determines sound periods and silent periods based on a signal generated by one of the plurality of melodic lines of the ringer melody and is driven in the sound periods.

13. The radio communication device according to claim 12, wherein the second notifying means includes:
- a vibrating means for vibrating at time of receiving the incoming call; and
- a vibration control means for controlling the vibrating means in such a manner that the vibrating means is vibrated in the sound periods.

14. The radio communication device according to claim 12, wherein the second notifying means includes:
- a light emitting means for emitting light at time of receiving the incoming call; and
- a light emission control means for controlling the light emitting means in such a manner that the light emitting means emits the light in the sound periods.

15. The radio communication device according to claim 12, wherein the second notifying means includes:
- a display means for displaying an image; and
- a display control means for controlling the display means in such a manner that the display means varies the image in the sound periods.

* * * * *